June 12, 1956

T. E. PIAZZE ET AL 2,749,817

BAG MAKING MACHINE

Filed July 18, 1952

INVENTORS.
Thomas E. Piazze &
David C. McCluskey.
By Cromwell, Greist & Warden.
Attys.

INVENTORS.
Thomas E. Piazze +
David C. McCluskey
By Cromwell, Greist + Warden
Attys.

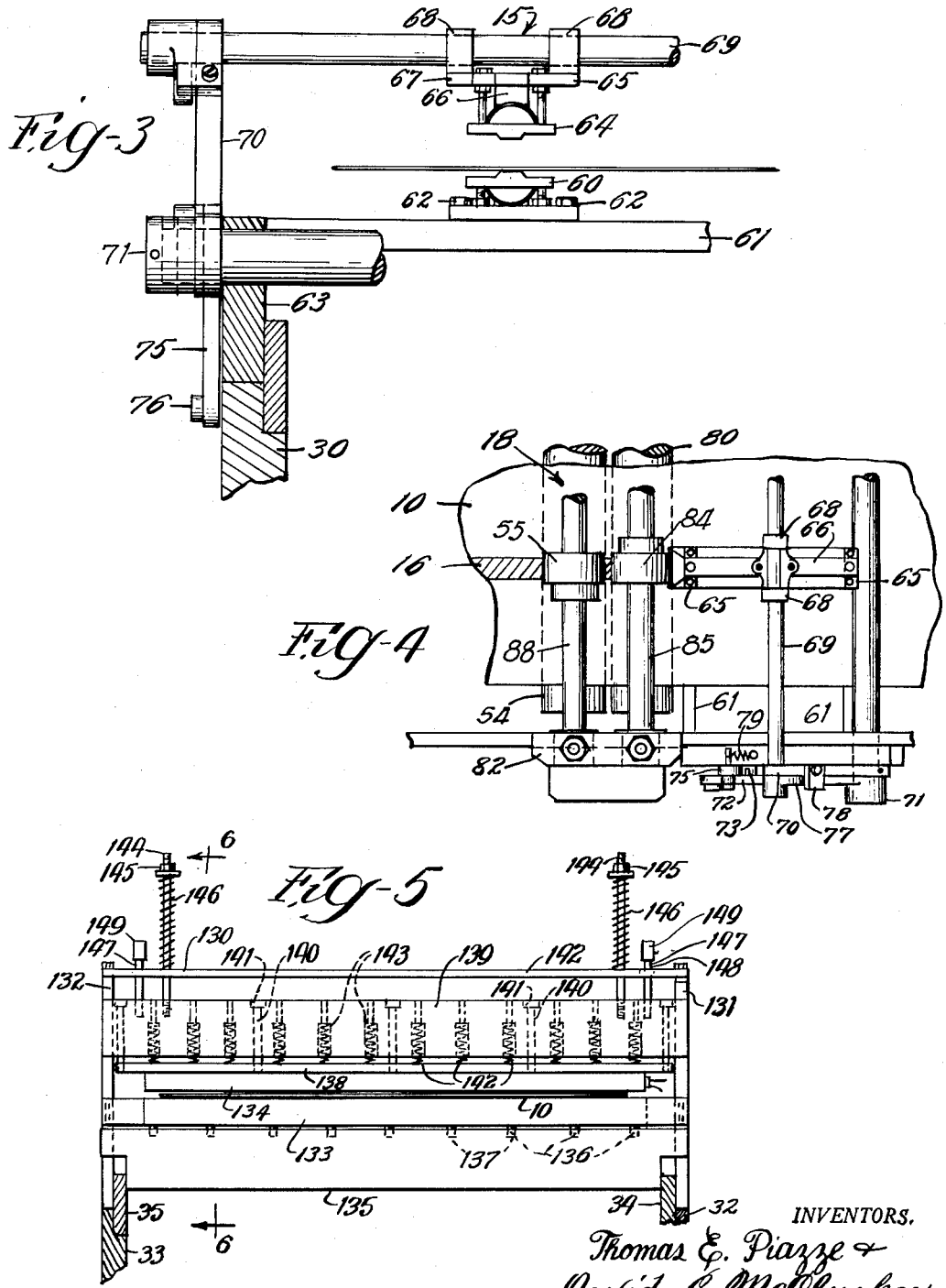

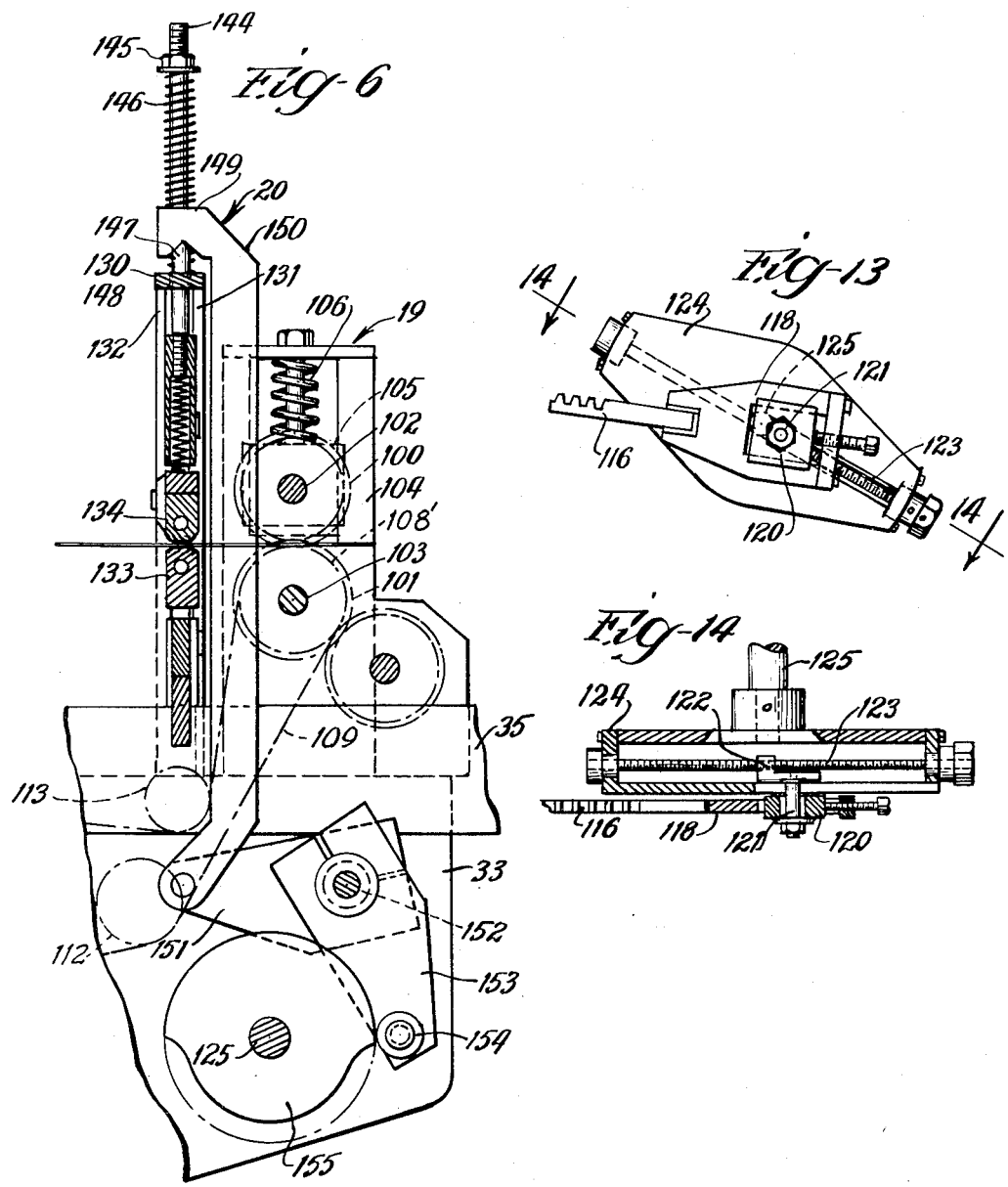

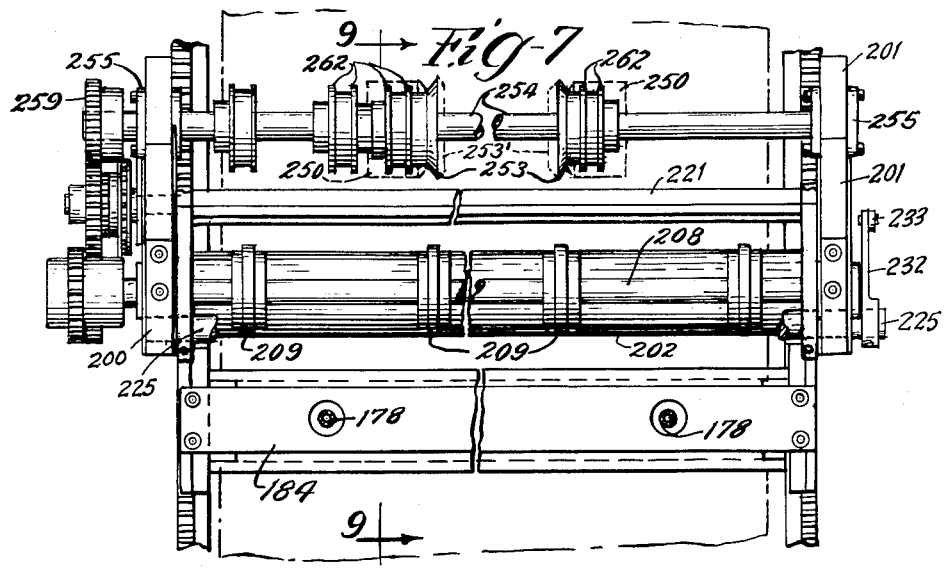
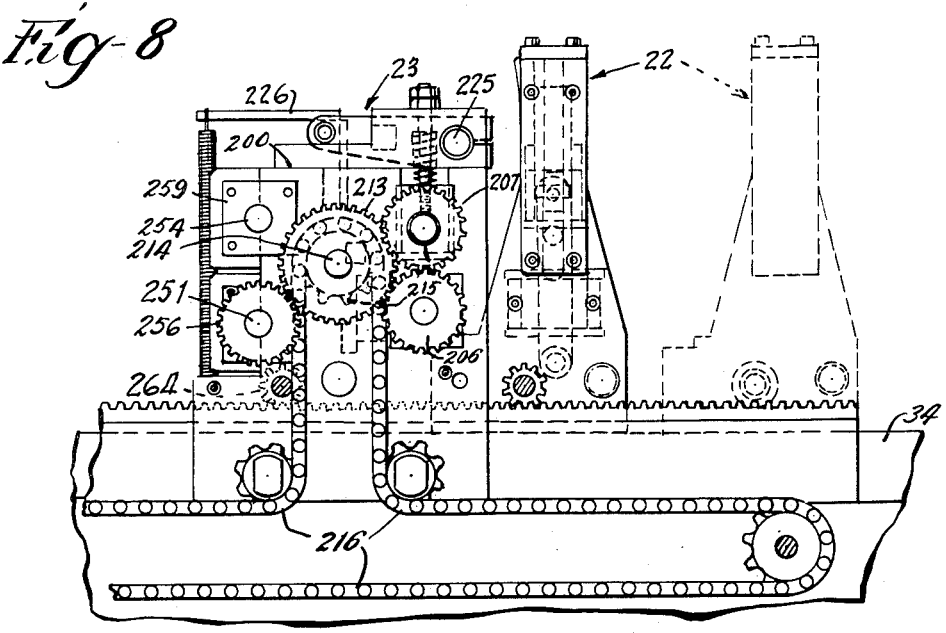

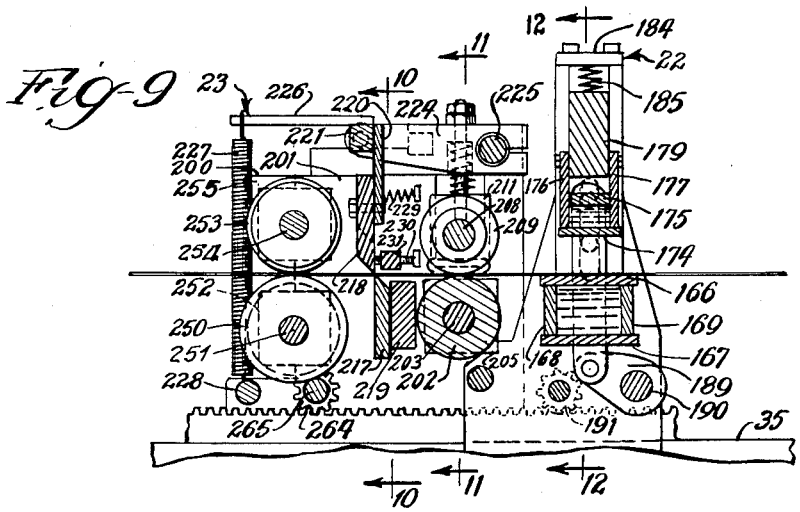
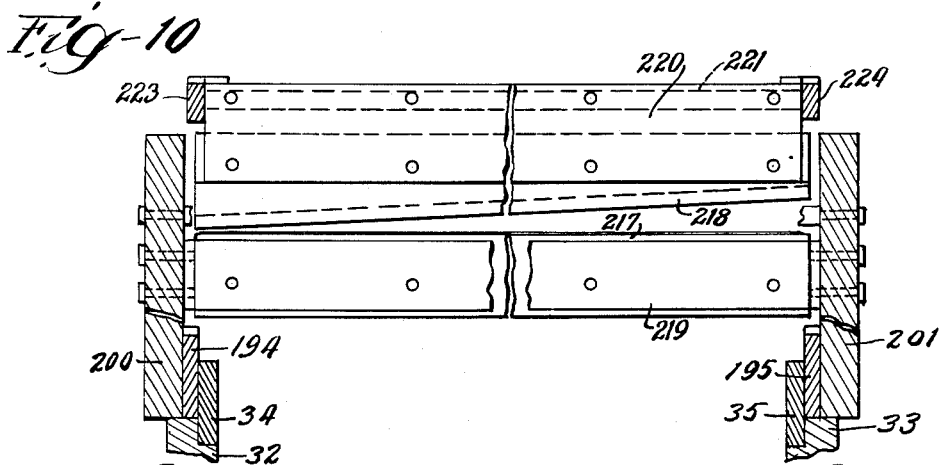
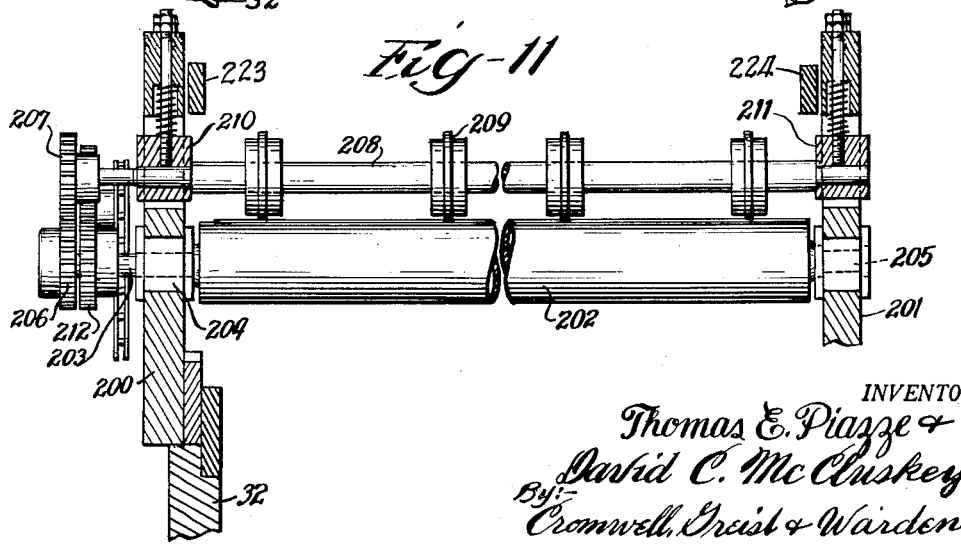

June 12, 1956 T. E. PIAZZE ET AL 2,749,817
BAG MAKING MACHINE
Filed July 18, 1952 8 Sheets-Sheet 7
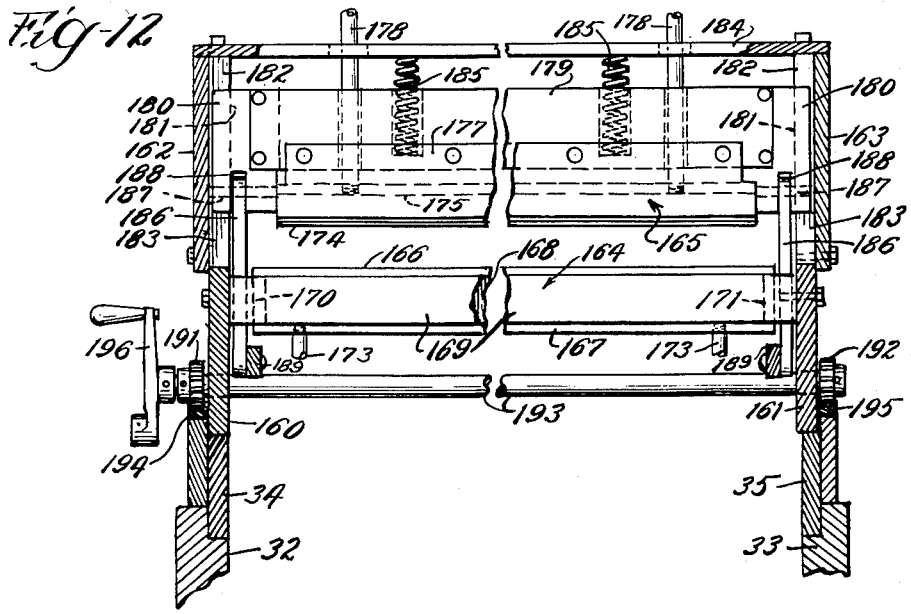
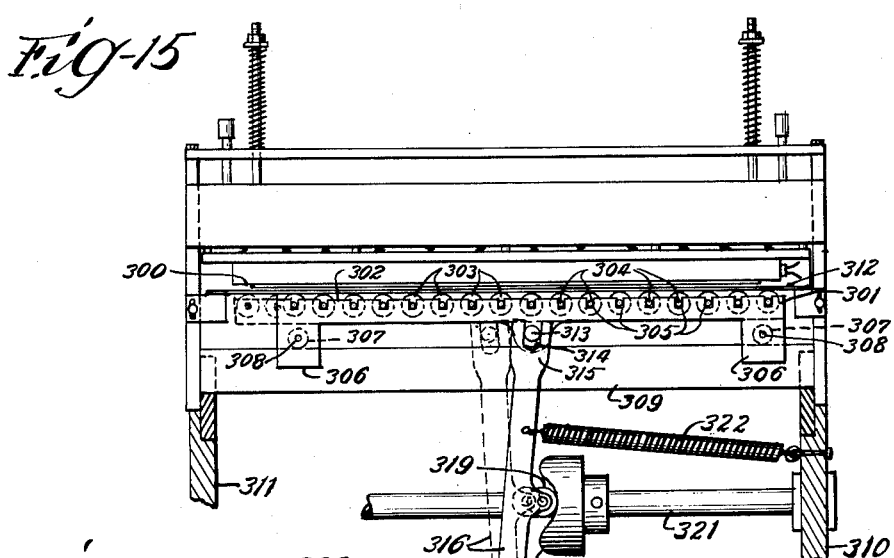
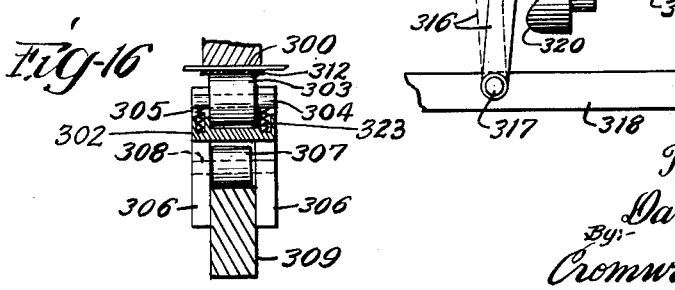
INVENTORS.
Thomas E. Piazze &
David C. McCluskey.
By: Cromwell, Greist & Warden
Attys June 12, 1956 T. E. PIAZZE ET AL 2,749,817
BAG MAKING MACHINE
Filed July 18, 1952 8 Sheets-Sheet 8
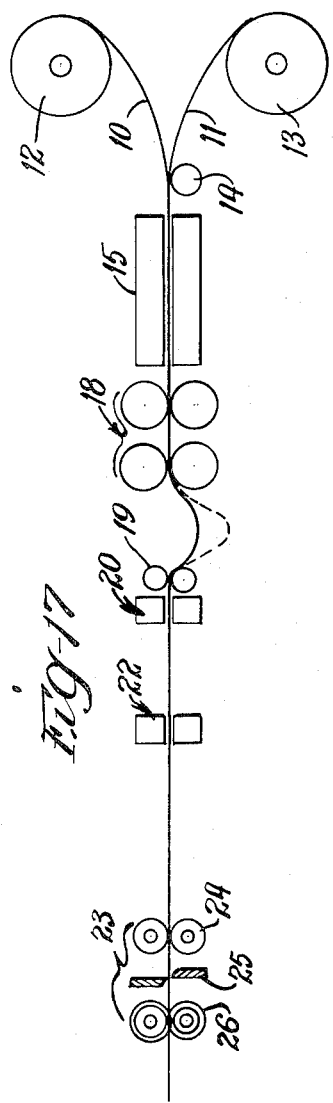
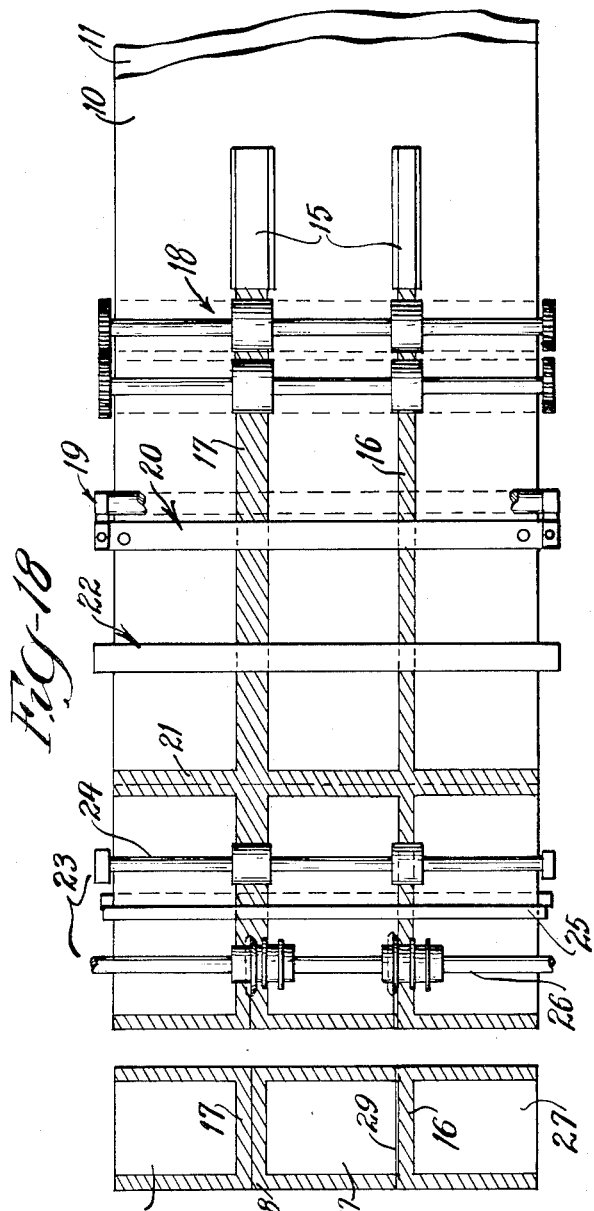
INVENTORS.
Thomas E. Piazze &
David C. McCluskey.
By:-
Cromwell, Greist & Warden.
Attys.

United States Patent Office 2,749,817
Patented June 12, 1956

2,749,817

BAG MAKING MACHINE

Thomas E. Piazze, Mount Vernon, and David C. McCluskey, Gambier, Ohio, assignors, by mesne assignments, to Continental Can Company, Inc., New York, N. Y., a corporation of New York Application July 18, 1952, Serial No. 299,590

8 Claims. (Cl. 93—8)

This invention relates to the manufacture of bags or pouches and is particularly concerned with improvements in a machine for longitudinally and transversely sealing superimposed webs or sheets of flexible material and thereafter cutting and slitting the sealed material to form a plurality of bags or pouches.

It is a general object of the invention to provide a machine for forming bags or pouches which comprises means for continuously feeding two webs of bag forming sheet material into face-to-face relation in combination with longitudinal seam forming means spaced laterally of the two webs to divide the same into continuous tube formation, transversely extending sealing means for applying cross seals to the webs at intervals corresponding to one dimension of the pouches and means for transversely cutting and longitudinally slitting the sealed webs to divide the same into a plurality of flat pouches, each of which is closed along three of the sides thereof.

It is a more specific object of the invention to provide a pouch forming machine which comprises cooperating rollers for feeding through the machine a pair of webs of heat sealable material in face-to-face relation, longitudinally extending heating bars spaced transversely of the machine for placing in the material one or more longitudinal seams, transversely extending sealing bars which are adapted to seal crosswise of the webs at longitudinal intervals corresponding to one of the desired dimensions of the pouches and transversely extending cut-off members for severing the seamed material transversely to divide it into sections together with slitting members for slitting the cut-off sections longitudinally to divide the same into a plurality of pouches.

It is another object of the invention to provide a machine for fabricating flat bags or pouches from heat sealable web material wherein there is provided a supporting frame having means thereon for feeding two webs into superimposed relation, means for continuously forming transversely spaced, longitudinally extending seals in the superimposed webs, means for intermittently forming in the webs longitudinally spaced, transversely extending seals and means for cutting and slitting the webs transversely and longitudinally to divide the same into a plurality of individual pouches.

It is a further object of the invention to provide a machine of the character described wherein the transverse seal forming means comprises heat sealing bars and cooperating seal cooling bars arranged to engage the webs at longitudinally spaced intervals in timed relation to the movement of the webs.

It is still another object of the invention to provide a pouch fabricating machine of the character described wherein the seal cooling bars are mounted on the supporting frame for adjustment longitudinally thereof to vary the position of the same relative to the heat sealing bars.

It is a further object of the invention to provide in a pouch fabricating machine of the character described transverse cutting and longitudinal slitting members mounted for longitudinal adjustment on the supporting frame whereby to adjust the position of the same relative to the position of the transverse heat sealing and cooling bars.

It is a still further object of the invention to provide in a bag or pouch fabricating machine mechanism for sealing a pair of superimposed webs of heat sealable material which mechanism will apply the necessary heat and pressure for forming the seal or seam regardless of variations in the thickness of the materials across the area in which the seam is formed.

It is another object of the invention to provide a mechanism for longitudinally and transversely sealing a pair of superimposed webs of material to form a plurality of pouches wherein the transverse sealing members comprise cooperating sealing bars one of which is provided with a plurality of rollers mounted on the surface thereof and wherein said last mentioned sealing bar is mounted for reciprocating movement transversely of the webs, thereby to roll the material between the same and the cooperating sealing bar.

It is a still further object of the invention to provide a machine of the type described wherein means is provided for readily varying the number and spacing of the sealing and cutting members to adapt the machine for the manufacture of pouches of different sizes from the web material.

These and other objects of the invention will be apparent from a consideration of the machine which is shown by way of illustration in the accompanying drawings, wherein:

Fig. 3 is a partial cross section taken generally on the line 3—3 of Fig. 1, to an enlarged scale;

Fig. 4 is a partial plan view taken generally on the line indicated at 4—4 in Fig. 1;

Fig. 5 is a cross section, taken on the line 5—5 of Fig. 1;

Fig. 6 is a cross section, to an enlarged scale, taken on the line 6—6 of Fig. 5;

Fig. 7 is a partial plan view taken on the line 7—7 of Fig. 1, to an enlarged scale;

Fig. 8 is a side elevation to an enlarged scale of the transverse seal pressing, the transverse severing and the longitudinal slitting mechanisms;

Fig. 9 is a section taken on the line 9—9 of Fig. 7;

Fig. 10 is a section taken on the line 10—10 of Fig. 9;

Fig. 11 is a section taken on the line 11—11 of Fig. 9;

Fig. 12 is a section taken on the line 12—12 of Fig. 9;

Fig. 13 is an elevation, to an enlarged scale, of a portion of the drive mechanism for the cutting and slitting devices;

Fig. 14 is a section taken on the line 14—14 of Fig. 13;

Fig. 15 is a cross section showing a modified form of the transverse sealing mechanism;

Fig. 16 is a section taken on the line 16—16 of Fig. 15 to an enlarged scale;

Fig. 17 is a schematic side elevation illustrating the operation of the mechanism; and Fig. 18 is a schematic plan view of the mechanism.

Figure 1:
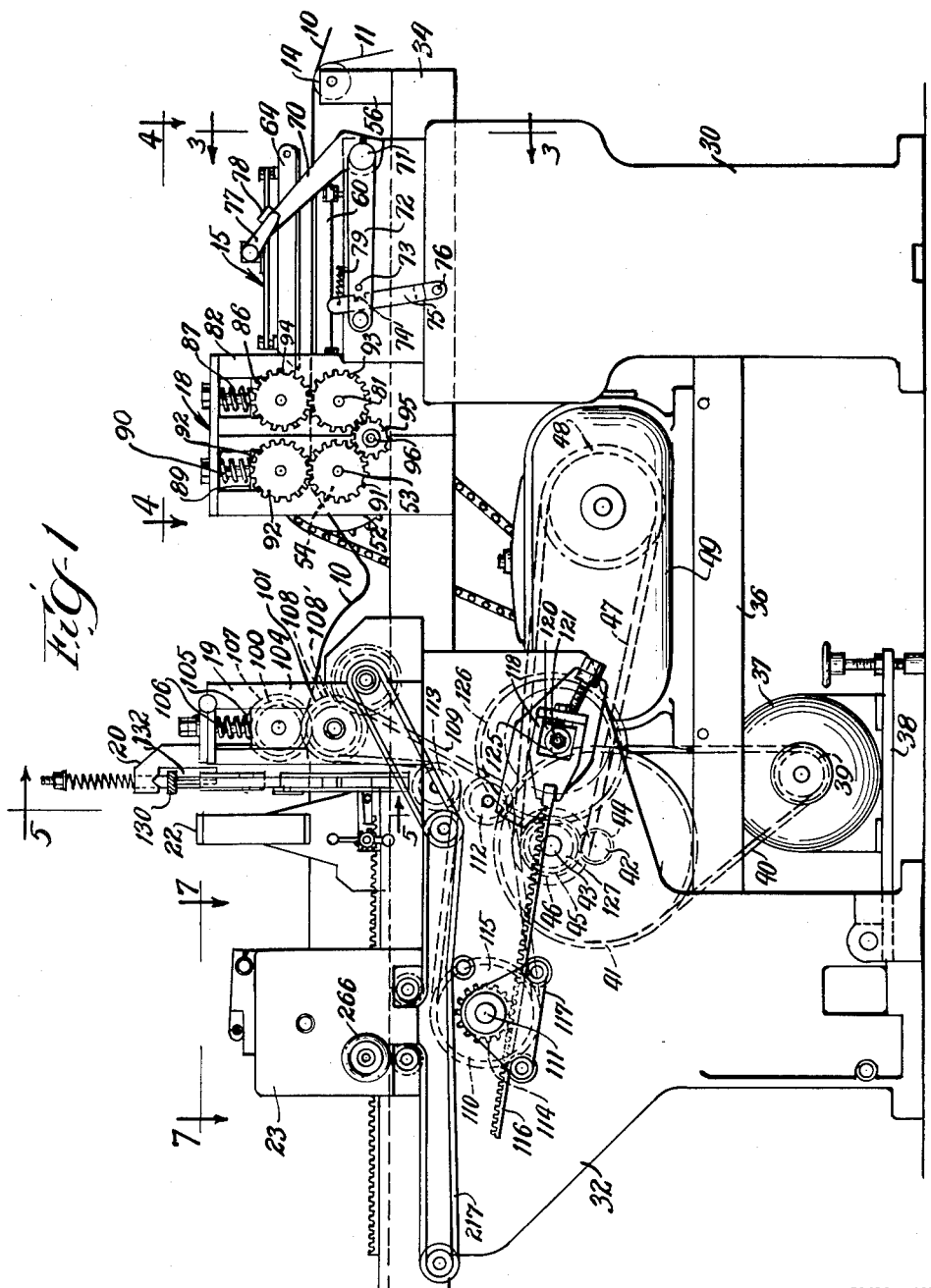
Fig. 1 is a side elevation of a pouch fabricating machine incorporating the principal features of the invention.
Figure 2:
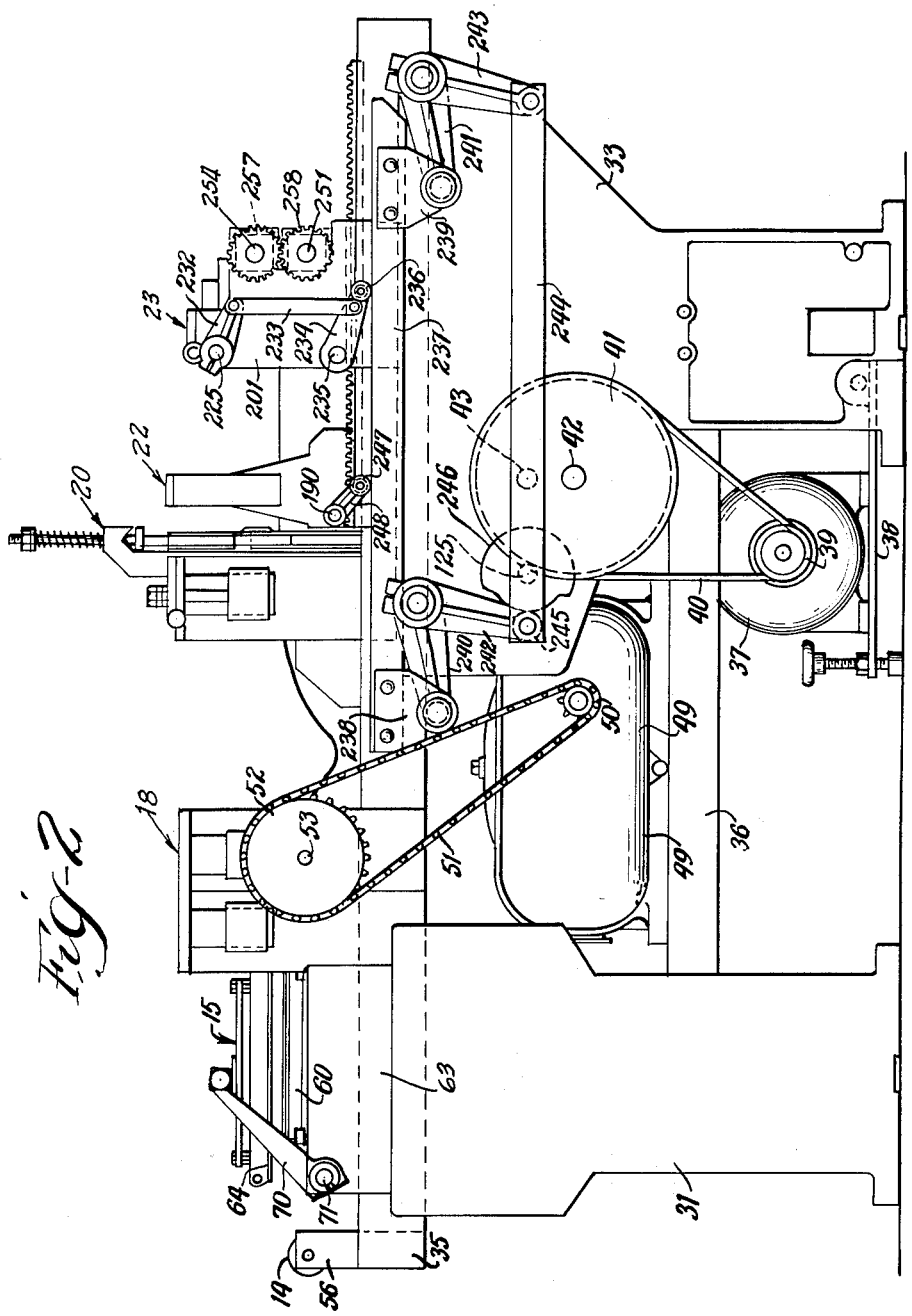
Fig. 2 is an elevation of the side of the machine which is opposite that shown in Fig. 1.

The machine of the present invention will be best understood by referring first to the general arrangement and operation of the several mechanisms constituting the same, which are illustrated in Figs. 1, 2, 17 and 18. As seen in Figs. 17 and 18, particularly, two supply webs 10 and 11 are provided which are fed from the supply rolls 12 and 13. The webs are of suitable pouch or bag forming sheet materials having heat sealing characteristics or having a coating of heat sealing material on the opposed faces thereof. The webs 10 and 11 are first brought into superimposed relation over a guide roll 14 which is at the entrance or feeding end of the machine. The superimposed webs pass between the sealing irons of a longitudinal seal forming mechanism indicated at 15. The sealing mechanism 15 applies to the superimposed webs 10 and 11, in the illustrated arrangement, two laterally spaced, longitudinal heat seals 16 and 17 which may be the same or different widths. The longitudinally sealed webs next pass through a combination web feeding and seal or seam pressing and setting mechnism indicated at 18. The webs 10 and 11 are advanced continuously and the longitudinal seams or seals 16 and 17 are pressed and set by the mechanism 18 without interrupting the travel of the webs. At a distance spaced forwardly, in the direction of travel of the material, from the mechanism 18, sufficient to allow the material to loop or pile up somewhat, a guide device 19 is positioned through which the web is fed to a transverse seal forming device 20. The seal forming device 20 applies to the longitudinally sealed material spaced transverse seals 21 of the desired width. A transverse seal pressing and cooling device 22 is adjustably positioned beyond the sealing device 20 and is arranged to engage each successive seal 21 and cool the same. The longitudinally and transversely sealed material next passes to a feeding and severing mechanism which is indicated at 23 and which comprises an intermittently operating fed mechanism 24, a vertically reciprocating transverse severing mechanism 25 and a longitudinal slitting mechanism 26. In the arrangement shown, the sealed material is severed transversely by the severing mechanism 25 and longitudinally slit by the slitting mechanism 26. The transverse and longitudinal severing and slitting mechanisms 25 and 26 divide the sealed material into a plurality of individual pouches indicated at 27. In the illustrated form of the device the sealed web is slit intermediate the edges of one longitudinal seam on the line 28 to separate the end pouch 27 from the web section which has been severed transversely by the cutting mechanism 25, the line of severance being intermediate the side edges of the transverse seam 21. The two pouch members 27 at the other end of the severed web section are separated by the longitudinal slitting mechanism on the line 29 which is adjacent the other longitudinal seam 16. This arrangement provides three pouches 27 of the same size across the sealed webs. The seam forming mechanisms may be adjusted, together with the severing and slitting mechanisms, to provide a different number of pouches of the same or different sizes, as desired, from a given width of web stock material.

Referring now to the details of the several mechanisms which constitute the machine, all the mechanisms are mounted on a supporting frame comprising laterally spaced, vertically extending, side plate or pedestal members 30 and 31 at the feeding end of the machine, and longitudinally spaced therefrom, similar upstanding plate members 32 and 33, at the discharge end of the machine. The vertical plates 30, 32 and 31, 33 are tied together in the longitudinal direction by side rail members 34 and 35, respectively, which are positioned in longitudinally extend, inwardly facing recesses at the tops of the side plates. The side rails 34 and 35 extend the full length of the machine and form a bed for the various mechanisms. The side plate members at the four corners of the machine are also tied together by a platform structure 36 which is located at a lower level.

A main drive for operating the various mechanisms is provided which comprises a motor 37 which is mounted on a pivotally mounted adjustable platform 38 at the base of the machine. The motor 37 has its drive pulley 39 connected by a belt 40 with a pulley 41 on a stub shaft 42 at the side of the machine adjacent the plate 33. The stub shaft 42 is connected to a main drive shaft 43 by pinion 44 and gear 45, the latter being on the main drive shaft 43 by pinion 44 and gear 45, the latter being on the main drive shaft 43, which extends transversely between side plates 32, 33. A pulley 46 on the power shaft 43 is connected by a drive belt 47 with an input pulley 48 on a speed reducing device 49 mounted on the intermediate platform 36. An output sprocket 50 of the speed reducing device 49 is connected by a drive chain 51 with a sprocket 52, which is mounted on the end of a cross shaft 53 carrying the lower one of a pair of feed rollers 54 and 55 which are part of the web feeding mechanism indicated at 18.

The webs of stock material 10 and 11, which are of the size and width required to form the desired pouch size, are fed from rolls of stock suitably mounted in a conventional manner at the end of the machine. The webs 10 and 11 are brought together into superimposed relation and fed over the guide roll 14 (Fig. 1) which is suitably journaled in side bearing plates 56 extending upwardly at the ends of the side rails 34 and 35.

The superimposed webs are fed through the heat sealing mechanism 15 by operation of the feed rollers 54 and 55, the travel of the composite web being continuous.

The longitudinal heat sealing mechanism 15 is mounted between the side rails 34, 35 adjacent the feed in roller 14 and comprises one or more pairs of cooperating heat sealing bars extending longitudinally of the machine. Any number of pairs of the heat healing bars may be employed depending on the number of longitudinal seals required to provide the size and number of pouches desired. Each pair of sealing bars comprises a lower or relatively fixed bar 60 which is secured in transversely adjustable sliding relation on longitudinally spaced cross bars 61 by bolts 62 or the like provided at each end of the bar support or body member. The cross bars 61 are supported between vertically extending side plates 63 mounted on the top of the side pedestal members 30 and 31. Cooperating upper sealing bars 64 are arranged above each sealing bar 60 which are mounted for vertical movement and also for transverse adjustment. Each upper sealing bar or plate 64 is connected by bolts or the like in depending relation from small end plates 65 which are secured to the ends of a longitudinally extending carrier plate 66, which is in turn secured at its center to a U-shaped bracket 67. The leg portions 68 of the U-shaped bracket are pivotally and slidably mounted on a cross rod 69 extending transversely of the machine and supported at its ends in arms 70. Each of the end arms 70 is pivoted at 71 to a side plate 63 provided with a cooperating angular extending operating arm 72 located on the outside of the support plate 63. The arm 72 at one end of the machine is provided with a pin 73 adapted to be received in a notch 74 in a latch arm 75 which is pivoted at 76 to the side pedestal plate 30. Cooperating stop members 77 and 78 on the cross shaft 69 and the arm 70 limit the pivoting of the shaft 69 relative to the arm 70 when it is moved into the upper position to raise the upper sealing plate 64 out of contact with the web. The arm 72 is, of course, adapted to be latched by the latch arm 75, the latter being urged clockwise into latching position by spring 79, to hold the upper sealing plate 64 in the upper or out of use position.

From the sealing mechanism 15 the longitudinally sealed web moves into the pressing and feeding mechanism 18. The seal or seam pressing portion of the mechanism 18 comprises a bottom roller or drum 80 which is mounted on a shaft 81 journalled in upstanding side supporting plates 82 which rest on or are secured to the side rails 34 and 35. A plurality of pressing rollers 84 are mounted on a cross shaft 85 above the shaft 81, which cross shaft 85 is journaled in slidable bearing blocks 86 which are received in guideways in the supporting plates 82 and held in spring pressed relation by compression springs 87. The rollers 84 are of approximately the same width as the longitudinal seam areas and press the seam as it leaves the sealing irons or plates 60 and 64.

The side supporting plates 82 also carry the lower and upper feed rollers 54 and 55, the lower roller 54 being mounted on the cross shaft 53. The top feed roller 55 may be a single roller or a plurality of small rollers transversely spaced on the cross shaft 88 which is journaled in suitable sliding bearing members 89 mounted in guideways provided in the supporting plates 82 and held in spring pressed relation by compression springs 90. The feed roller shafts 53 and 88 are connected in driving relation at one end by the gears 91 and 92. The shaft 53 also drives the shafts 81 and 85 by means of the connected gears 93 and 94 carried on the end of these shafts and an idler pinion 95 on the stub shaft 96. The operation of the feed rolls 54 and 55 is continuous and the web is moved forwardly or advanced at a continuous rate by these members.

The web guide 19 for the transverse seal forming mechanism 20 is spaced a sufficient distance forwardly of the feeding mechanism 18 to permit the web to form a loop between the two mechanisms 18 and 20 which is taken up by the intermittent feeding of the web upon each sealing operation of the mechanism 20.

The web guiding device 19 which is mounted adjacent the transverse sealing mechanism 20 comprises a pair of upper and lower rollers 100 and 101 which are mounted on cross shafts 102 and 103. The lower shaft 103 is journaled in a pair of upright side supporting plates 104. The upper roller 100 has its shaft 102 journaled in slidable bearing members 105 which are mounted in suitable guideways in the side plates 104 and which are held in spring pressed relation by the compression springs 106. The upper roller 100 may be connected in driving relation with the lower roller 101 by means of gears 107 and 108 which are mounted on the ends of the shafts 102 and 103, respectively. The lower shaft 103 is provided with a sprocket 108' at the one end which is connected by driving chain 109 with a sprocket 110 on an intermittently driven cross shaft 111. The chain 109 is guided intermediate the sprockets 108' and 110 by guide sprockets 112 and 113 suitably mounted on the side plate 32.

The intermittently driven shaft 111 is provided at the one end with a pinion 114 connected to a one-way clutch, indicated at 115, and driven by a reciprocating rack 116 having teeth on the top thereof engaged with the pinion 114 and held in engagement therewith by a supporting saddle 117. The rack 116 is connected at the other end to a yoke 118 (Figs. 13 and 14) which carries, in sliding adjustable relation thereon, a pivot bearing 120. The pivot 121 of the bearing 120 is fastened to a bracket 122 which is connected in screw threaded relation with a threaded shaft 123. The threaded shaft 123 is mounted for rotation in a carrier frame 124 which is secured at the end of a driven cross shaft 125 and continuously rotated thereby. The frame 124 rotates continuously about the axis of the driven shaft 125 while the yoke 118 carrying the rack bar 116 rotates about the pivot 121 as the latter is carried about the axis of the shaft 125 depending upon its location on the adjusting bar or shaft 123.

The driven shaft 125 is connected to the main drive of the machine by means of a gear 126 which is in engagement with a pinion 127 on the main drive shaft 43.

The transverse seal forming mechanism 20 (Fig. 5) a fixed supporting cross bar 130 which is secured at its opposite ends on the upright support members 131 and 132, which support members are secured at the bottom to the side rails 34 and 35. Cooperating lower and upper heat sealing bars 133 and 134 are supported on the upright side members 131 and 132 and the cross bar 130.

The bottom sealing bar 133 is mounted on a fixed cross bar 135 which has slots in the end edges to accommodate the side plates 131 and 132 and which supports the sealing bar 133 by means of a plurality of spacer pins 136 suitably mounted in pockets 137 provided in the upper edge of the cross bar 135.

The upper sealing bar 134 is mounted on a supporting cross bar 138 which is connected to a vertically extending, vertically movable cross support member 139 by means of a plurality of transversely spaced headed suspension bolts 140. The suspension bolts 140 are mounted for limited vertical movement in sockets or bores 141 provided in the supporting member 139. The supporting cross bar 138 is normally held in downwardly spaced relation to the cross support 139 by means of a plurality of compression springs 142 which are housed in suitable bores or pockets 143 in the cross support 139 and which resiliently urge the cross bar 138 downward. The cross support member 139 is provided with guideway forming slots in its end edges and is mounted to slide on the side supports 131 and 132, the latter forming guides therefor. Suspension or hanger rods 144 are connected at each end of the member 139 and extend in upstanding sliding relation through suitable guide apertures in the cross bar 130. The hanger rods 144 are threaded at the upper ends and provided with adjustable stop nuts 145. Compression springs 146 extend between the bar 130 and the stop nuts 145 which tend to urge the cross support 139 upwardly toward the cross bar 130. The cross support or frame 139 is connected by hanger rods or pins 147 with an actuator frame, the pins 147 extending in slidable relation through suitable guide apertures 148 in the cross bar 130 and being secured to the overhanging top ends 149 of upright actuator arm members 150 at each side of the machine. The upright actuator arms 150 are pivotally connected at the bottom ends to the ends of arms 151 which are secured on a cross shaft 152. The cross shaft 152 is provided at one end with a cam arm 153 having a cam roller 154 which engages an operating cam 155 on the main cam shaft 125. The track surface of cam 155 is so arranged that it reciprocates the upper sealing bar 134 in properly timed relation to the intermittent movement of the web material and holds the sealing bars 133 and 134 in cooperating seal forming relation for the proper interval to effect the cross seams or seals. The sealing bars 133 and 134 are, of course, supplied with conventional electric heating elements which are connected to a suitable current source.

After each transverse seal 21 is formed the web is advanced from the seal forming mechanism 20 to a seal cooling mechanism 22. The seal cooling mechanism 22 is mounted on a frame which is movably supported on the side rails 34 and 35, and which comprises lower side plate members 160 and 161 extending vertically above the main side frame rails 34 and 35, respectively. The side plates 160 and 161 are provided with upwardly extending extension plates 162 and 163. Lower and upper cooling members 164 and 165 are mounted on the side frame plates 160, 161 and 162, 163.

The lower cooling member 164 comprises top and bottom plates 166 and 167 which are connected by side plates 168 and 169 and which form with end closure plates 170 and 171 a liquid receiving tank structure of generally rectangular cross section. The side plates 168 and 169 project beyond the end plates 170, 171 and are secured by suitable bolts to the side frame plates 160 and 161. The end plates 170 and 171 are spaced inwardly of the side plates 160 and 161 to provide space for accommodating an actuating member for the top cooler member 165 which extends vertically between the same. The bottom plate 167 of the cooling member 164 is provided with suitable connections 173 for receiving a circulating fluid.

The upper cooling device 165 comprises vertically spaced bottom and top plates 174 and 175 and cooperating side plates 176 and 177, together with suitable end closure plates which form therewith a tank-like member of rectangular cross section. The top plate 175 is provided with suitable connections 178 for circulating therein a cooling fluid. The side plates 176 and 177 are extended above the top plate 175 and connected to a cross supporting bar 179. The cross supporting bar 179 is secured at each of its ends to a reciprocable block 180 and each end block is grooved or recessed at its outer edge to provide a guideway 181 positioned astraddle a guide bar 182 which is secured to each of the side plates 162 and 163, and which extends above the bottom side plates 160 and 161. The bottom side plates 160 and 161 are slotted or recessed at 183 for receiving the reciprocable blocks 180 as they are moved in a vertical direction.

A top connecting bar 184 extending between the side frame plates 162 and 163 is apertured to accommodate the connection 178. The cross supporting bar 179 and the cooling box 165 which it carries are urged downwardly away from the top cross bar 184 by the springs 185 which extend through the suitable apertures in the bar 179 and engaged in top plates 175 of the box 165. The top cooler box 165 is moved or actuated in the vertical direction by a side link 186 pivotally mounted on a pin 187 in a recess 188 in each of the end guide plates 180 and extending downwardly in the vertical direction for pivoted connection at the bottom end with an arm 189 on a rock shaft 190 extending crosswise of the machine. The rock shaft 190 is reciprocated by a mechanism which will be subsequently described.

The side frame plates 160 and 161 and the mechanism which they carry are adjustable lengthwise of the machine by means of pinions 191 and 192 which are mounted on a cross shaft 193 journaled in the side plates 160 and 161 and extending outwardly beyond the same to bring the pinions 191 and 192 into operating engagement with longitudinally extending racks 194 and 195 resting on the tops of the main frame members 32 and 33 outside of the rails 34, 35. The shaft 193 is provided with an operating handle 196 at one end to facilitate turning the pinions 191 and 192 and adjusting the cooler frame.

The feeding and cutting mechanism 23 is located beyond the cooling mechanism 22 and comprises laterally spaced upright plates 200 and 201 which are located outside of the rack members 194 and 195, respectively, and which have their bottom edges resting in sliding relation on the outer top edges of the upright frame plates 32 and 33. At the end of the mechanism 23 adjacent the cooling mechanism 22, there are mounted, in the side plates 200 and 201, cooperating feed rollers which impart intermittent movement to the web and carry it through the transverse seal forming and cooling mechanisms and the cutting and slitting mechanism. The lower one 202 (Figs. 9 and 11) of the feed rollers is mounted on a shaft 203 journaled in bearings 204 and 205 in the side plates 200 and 201, respectively. The shaft 203 of the roller 202 is extended at the one end and provided with a gear 206 (Figs. 7 and 11) which meshes in driving relation with a gear 207 on the shaft 208 which carries a plurality of roller sections 209 forming the upper one of the feed rollers. The shaft 208 is journaled in spring pressed bearings 210 and 211 slidably mounted in suitable guideways in the side plates 200 and 201. The shaft 203 carries an inner gear 212 which is in driving engagement with a driving pinion 213 mounted on a stub shaft 214 near the center of the side plate 200. The stub shaft 214 also carries a sprocket 215 which is driven by chain 216. The power connection for driving the chain will be described subsequently.

Cooperating lower and upper transverse cutting knives 217 and 218, respectively (Figs. 9 and 10), are arranged between the side plates 200 and 201 immediately adjacent the feed rollers 203 and 209. The lower knife 217 is mounted on a cross support plate 219 which is secured at its ends by bolts or the like to the side plates 200 and 201. The upper knife 218 is secured on a cross plate 220 which is mounted at its upper edge on the cross bar 221. The cross bar 221 is pivotally connected at its ends to the ends of side arm members 223 and 224. Each of the side arm members 223 and 224 is secured at its other end to a rocking shaft 225 extending across the machine. A forwardly extending arm 226 secured at each end of the cross bar 221 is urged in the downward direction by a tension spring 227 which is connected at one end to the free end of the extension 226 and at the other end to a cross bar 228 connecting the side plates 200 and 201. The upper knife holder plate 220 is pulled rearwardly to bring the cutting knife 218 into alignment with the bottom cutting knife 217 by a spring 229 which is connected at one end to the plate 220 and at the other end to the side plate or other portion of the frame. The rearward movement of the upper knife 218 is limited by adjustment screws 230 which are mounted on a cross bar 231 extending between the side plates 200 and 201.

The rocking shaft 225 extends at one end (Figs. 2 and 7) and is provided with an operating arm 232 which is connected by a link 233 extending in a generally vertical direction with a bottom arm 234 pivoted at 235 to the side plate 201, the latter being provided on its free end with a cam roller 236 which is engaged by a generally horizontal cam bar 237. The cam bars 237 is connected at its opposite ends to plates 238 and 239 which are pivotally connected at their lower ends with the ends of bell crank levers 240 and 241, the other arms 242 and 243 of the bell cranks being pivotally connected to an operating bar 244 which carries at one end a cam roller 245 engageable with the cam 246 on the cam shaft 125.

The cam bar 237 also operates the cross shaft 190 by engaging a cam roller 247 on a cam arm 248 which is secured at one end of the cross shaft 190. With this construction the operation of the cam 246 on the cam shaft 125 serves to actuate the cooling members 164 and 165 and the transverse cutting bars 217 and 218.

The mechanism 23 also includes a longitudinal slitting device which comprises a lower back-up roller or a series of roller sections 250, as shown, which are adjustably mounted on a cross shaft 251 journaled in bearings 252 which are mounted on the side plates 200 and 201. Cutting knives or disks 253 are mounted on a transverse shaft 254 which is journaled in bearings 255 in the side plates 200 and 201. The shaft 251 is extended at one end and provided with a gear 256 which engages with the driving gear 213. The shafts 251 and 254 are connected in driving relation at the other end by gears 257 and 258. Each of the cutting knives or disks 253 is adjustable along the shaft 254 so that the width of the cut and the number of cuts can be varied depending on the size of the bag being made on the machine. Each of the cutting knives 253 is provided with a hub portion having peripheral ribs 262 engaging the surface of the bottom roller section 250 to hold the web material in position while the longitudinal slitting is taking place. The bottom roller sections 250 are preferably provided with slitting disks or knives 253' which cooperate with the slitting disks 253 on the shaft 254 to slit the material as it passes between the same. The entire unit 23 is adjustable on the main frame of the machine by means of pinions 264 which are mounted on a cross shaft 265 and which engage with the racks 194 and 195. The shaft 265 is provided at one end with a handle (not shown) to facilitate manual adjustment of the unit lengthwise of the machine. Both units 22 and 23 are provided with suitable means (not shown) for locking them in position when they have been adjusted, along the racks 194 and 195, to the desired position.

A modified form of the transverse sealing mechanism is illustrated in Figs. 15 and 16. In this form of the mechanism the top or upper sealing bar 300 is constructed and arranged for operating the same or substantially the same as in the mechanism previously described and shown in Figs. 5 and 6. The lower sealing bar 301 (Fig. 15) is mounted for transverse or crosswise reciprocating movement as distinguished from the fixed location of the sealing bar 133 in the form shown in Figs. 5 and 6.

The lower sealing bar 301 comprises a transversely extending body member 302 of generally U-shaped cross section arranged with the side flanges extending upwardly and a plurality of relatively small rollers 303 which are mounted on small shafts 304 extending in the longitudinal direction of the machine and received in aligned upwardly opening bearing slots 305 spaced along the side flanges. The rollers 303 are arranged so that they extend above the top surface of the body member 302. At the ends of the body member 302 generally U-shaped brackets 306 are provided each of which carries a roller 307 mounted on a small shaft 308, the shafts being journaled in the downwardly extending side walls of the brackets 306. The brackets 306 are positioned astraddle a fixed supporting bar 309 which extends transversely of the machine and is secured at its ends to side plates 310 and 311, the latter corresponding to plates 131 and 132 in Fig. 5. A relatively thin flat flexible blade of spring material 312 is connected at its ends to the side plates 310 and 311 and is positioned for engagement of its bottom surface by the rollers 303 when the sealing bar 301 is vibrated. At approximately the center of the body member 302 of the bar 301 a cross pin 313 is provided which engages in upwardly opening slots 314 in the forked end 315 of an upstanding vibrator arm 316 which is pivotally connected at 317 to a cross frame member 318 and which is provided intermediate its ends with a cam roller 319 engageable with the cam 320 on a cross cam shaft 321. The cam shaft 321 may be connected in any convenient manner for rotation by the power shaft of the machine. A tension spring 322 connected at one end to the body member 302 and at the other end to the side frame plate 310 holds the cam roller 319 against the operating surface of the cam 320. The arrangement thus provided causes the rollers 303 to be oscillated against the under surface of the blade 312 as the top sealing bar 300 is lowered to press the bag forming web material between the same and the lower sealing bar 301. The rollers 302 are preferably urged against the under surface of the blade 312 by springs 323 provided in the bearing slots 305 and the blade 312 is made of very flexible material so that the oscillating movement of the rollers 302 beneath the blade 312 tends to prevent wrinkling of the material and to iron out any wrinkles which may form when the heated top sealing bar 300 engages the material.

In the machine, as illustrated (Fig. 18), two webs are aligned one above the other with both webs being of the same width. If it is desired to provide bags having a lip, two webs can be fed to the machine with the longitudinal edges out of alignment sufficiently to form a lip on the open ends of the bags along the longitudinal margins of the webs. The lip may also be provided on the bags by using one web which is narrower than the other. The sealers and slitters may be adjusted to provide two bags across the width of the web material, in place of the three bags shown, by forming a single longitudinal seam and slitting down the middle of the seam. The two bags may be the same size by locating the single longitudinal seam in the center of the web or a different size by adjusting the mechanism to provide the seam at one side or the other of the center of the webs. The mechanism may be adjusted to obtain four bags or multiples thereof across the width of the material. Two longitudinal seams of substantial width, as seam 17, may be provided in symmetrical relation but spaced outwardly of the center line of the webs. The slitters would then be adjusted to slit down the middle of the seams and also along the center line of the webs, thus providing two bags on each side of the center line with the closed bottoms of each pair of bags adjacent each other and formed by slitting the longitudinal seams. The mechanism may be arranged, of course, to provide a single bag across the width of the machine by merely forming a single longitudinal seam along the edge of the webs and eliminating the longitudinal slitting.

The capacity of the machine may be multiplied by the use of webs which are not heat sealable but which have a heat sealing coating on one face only. The webs may be arranged in pairs with the coated surfaces in face-to-face relation and two or more pairs of the webs passed through the machine in superimposed relation.

While specific details of construction have been referred to in describing the illustrated form of the invention it will be understood that variations and modifications of the structures may be resorted to within the spirit of the invention.

We claim:

1. In a seam forming machine a supporting frame having means thereon for advancing two webs of heat sealable material in superimposed relation, a transverse seam forming mechanism, said seam forming mechanism comprising side supporting members mounted on said frame and heat sealing members mounted on said side supporting members on opposite sides of the path of movement of the webs, means for moving said heat sealing members toward and from each other to engage the webs therebetween, one of said heat sealing members comprising a transversely extending supporting member having a plurality of spaced pressing rollers on the face thereof which is adjacent the webs, said supporting member being mounted for movement transversely of the path of movement of the webs and power means to reciprocate said supporting member during the seam forming operation.

2. In a heat sealing mechanism, a supporting frame, means on said frame for advancing a pair of webs of heat sealable sheet material in superimposed relation, cooperating transversely extending heat sealing members arranged on opposite sides of the path of movement of the webs, one of said sealing members comprising a cross supporting member, a plurality of spring pressed rollers mounted on the web confronting face of said cross supporting member and means to oscillate said cross supporting member for the seam forming operation.

3. In a heat sealing mechanism as recited in claim 2 and a relatively thin, flexible, heat transmitting plate member arranged between the spring pressed rollers and the webs.

4. In a seam forming machine a supporting frame having means thereon for advancing two webs of heat sealable material in superimposed relation, a transverse seam forming mechanism comprising side supporting members mounted on said frame and heat sealing members mounted on said side supporting members on opposite sides of the path of advancing movement of the webs, means for moving said heat sealing members toward and from each other to engage the webs therebetween, one of said heat sealing members comprising a transversely extending supporting bar having a plurality of spaced pressing rollers on the face thereof which confronts the webs, said supporting bar being mounted for movement transversely of the path of movement of the webs, means to reciprocate said supporting bar during the seam forming operation, and a relatively thin heat transmitting member arranged in fixed relation to the frame between the pressing rollers and the webs.

5. In a seam forming machine a supporting frame having means thereon for advancing two webs of heat sealable material in superimposed relation, a transverse seam forming mechanism comprising side supporting members mounted on said frame and heat sealing members mounted on said side supporting members on opposite sides of the path of advancing movement of the webs, means for moving said heat sealing members toward and from each other to engage the webs therebetween, one of said heat sealing members comprising a transversely extending supporting bar having a plurality of relatively short pressing rollers mounted in spaced relation along one face thereof which confronts the web, which pressing rollers are each independently mounted in spring pressed relation on said supporting bar, said supporting bar being mounted for reciprocating movement transversely of the path of movement of the webs, means for reciprocating said supporting bar during the seam forming operation, and a relatively thin, narrow heat transmitting strip member positioned in fixed relation on the frame between the spring pressed rollers and the webs.

6. A method of providing a cross seam in two advancing webs of heat sealable film material which comprises engaging the webs on one face within the seam forming area with a relatively rigid heating element having a continuous surface which is the width of the seam extending across the webs, engaging the opposite face of the webs with a relatively thin and stiff metal strip and applying pressure to the outer face of the strip by engaging the same with a plurality of relatively small roller elements and vibrating said roller elements back and forth across the webs to iron the webs within the seam forming area.

7. In a pouch fabricating machine, a main supporting frame having means thereon for intermittently advancing two webs of heat sealable material in superimposed relation, a transverse heat seal forming mechanism mounted on said main frame and operable intermittently to transversely seal the webs at longitudinally spaced intervals, a transverse seal cooling mechanism, said seal cooling mechanism comprising side supporting members, means mounting said side supporting members on said main frame for adjustment longitudinally of the machine toward and from said seal forming mechanism, cooling plates mounted on said side supporting members and on opposite sides of the path of advancing movement of the webs, means for reciprocating said cooling plates toward and from the webs therebetween in timed relation to the operation of said seal forming mechanism, a web severing mechanism mounted on a supporting frame, means for adjusting said last mentioned supporting frame longitudinally of said main frame and toward and from said seal forming mechanism and said seal cooling mechanism, whereby to adjust the distance between successive transverse seals and the length of the pouches cut from said webs, and cooperating drive means for operating said web advancing means, said seal forming mechanism, said cooling plate reciprocating means and said web severing means in timed relation to each other and in any position of adjustment thereof relative to said main frame and to each other.

8. In a pouch fabricating machine, a main supporting frame, means on said main frame for intermittently advancing two webs of heat sealable material in superimposed relation, a transverse heat seal forming mechanism on said main frame having sealing elements operable intermittently to engage and transversely seal the webs, and a transverse seal cooling mechanism, said seal cooling mechanism comprising supporting side frame members mounted on said main frame, means for adjusting said side frame members longitudinally of said main frame and toward and from said seal forming mechanism, cooling boxes having their ends movably mounted on said side frame members, said cooling boxes being arranged on opposite sides of the path of advancing movement of the webs and means for reciprocating one of said cooling boxes relative to the other and to said side frame members at regular intervals and in timed relation to the intermittent advancing movement of said webs to engage the transversely sealed areas in the webs between the same, a transverse web severing means, a supporting frame adjustably mounting said web severing means on said main frame, and cooperating drive means for operating said web advancing means, said heat seal mechanism, said cooling box reciprocating means and said web severing means in any position of adjustment of said seal cooling mechanism and said web severing means relative to said heat seal forming mechanism and said main supporting frame.

References Cited in the file of this patent

UNITED STATES PATENTS

| | | |
|---|---|---|
| 2,013,086 | Baker | Sept. 3, 1935 |
| 2,024,820 | Ellens | Dec. 17, 1935 |
| 2,057,295 | Engel | Oct. 13, 1936 |
| 2,125,758 | Waters | Aug. 2, 1938 |
| 2,185,647 | Penn et al. | Jan. 2, 1940 |
| 2,326,931 | Dalton et al. | Aug. 17, 1943 |
| 2,473,552 | Staw | June 21, 1949 |
| 2,525,139 | Ligon | Oct. 10, 1950 |